United States Patent
Rhee

(10) Patent No.: US 8,098,615 B2
(45) Date of Patent: *Jan. 17, 2012

(54) NETWORK PROTOCOL

(75) Inventor: Sokwoo Rhee, Lexington, MA (US)

(73) Assignee: Millennial Net, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,820

(22) Filed: Apr. 15, 2011

(65) Prior Publication Data

US 2011/0188434 A1  Aug. 4, 2011

Related U.S. Application Data

(63) Continuation of application No. 12/264,703, filed on Nov. 4, 2008, now Pat. No. 7,948,930, which is a continuation of application No. 10/304,528, filed on Nov. 26, 2002, now Pat. No. 7,522,563.

(60) Provisional application No. 60/333,894, filed on Nov. 28, 2001.

(51) Int. Cl.
*H04M 1/38* (2006.01)

(52) U.S. Cl. .......... 370/318; 370/315; 370/328

(58) Field of Classification Search .......... 370/311, 370/351, 338, 346, 349, 401, 230.1, 230, 370/232, 234, 235, 280; 455/426.1, 455, 455/558, 563, 432.1, 11.1, 13.1, 554.1, 450, 455/453, 552.1; 340/825.72

See application file for complete search history.

(56) References Cited

U.S. PATENT DOCUMENTS

| | | | |
|---|---|---|---|
| 4,358,823 A * | 11/1982 | McDonald et al. | |
| 5,029,183 A | 7/1991 | Tymes | |
| 5,128,928 A * | 7/1992 | Wilder et al. | |
| 5,194,860 A * | 3/1993 | Jones et al. | |
| 5,257,372 A * | 10/1993 | Furtney et al. | |
| 5,355,371 A | 10/1994 | Auerbach et al. | |
| 5,428,636 A | 6/1995 | Meier | |
| 5,491,787 A * | 2/1996 | Hashemi | |
| 5,497,368 A | 3/1996 | Reijnierse et al. | |
| 5,608,721 A | 3/1997 | Natarajan et al. | |
| 5,654,959 A | 8/1997 | Baker et al. | |
| 5,719,861 A | 2/1998 | Okanoue | |
| 5,729,680 A | 3/1998 | Belanger et al. | |
| 5,745,483 A | 4/1998 | Nakagawa et al. | |

(Continued)

FOREIGN PATENT DOCUMENTS

EP  0 650 279  4/1995

(Continued)

OTHER PUBLICATIONS

Office Action from U.S. Appl. No. 10/304,528 dated Jan. 23, 2007.

(Continued)

*Primary Examiner* — Jean Gelin

(74) *Attorney, Agent, or Firm* — Pierce Atwood LLP; Joseph M. Maraia; Christopher E. Everett

(57) ABSTRACT

A system includes wireless network devices and a terminal device. The wireless network devices include a base station and plural repeater devices for routing data. The terminal device runs a network protocol to establish a presence in a wireless network that includes the wireless network devices. The terminal device enters a low-power mode when not communicating over the wireless network.

14 Claims, 12 Drawing Sheets

U.S. PATENT DOCUMENTS

| | | | |
|---|---|---|---|
| 5,790,817 A * | 8/1998 | Asghar et al. | |
| 5,809,222 A * | 9/1998 | Kizu | |
| 5,815,692 A * | 9/1998 | McDermott | |
| 5,854,994 A | 12/1998 | Canada et al. | |
| 5,940,400 A | 8/1999 | Eastmond et al. | |
| 6,005,853 A | 12/1999 | Wang et al. | |
| 6,005,884 A | 12/1999 | Cook et al. | |
| 6,028,857 A | 2/2000 | Poor | |
| 6,058,106 A * | 5/2000 | Cudak et al. | |
| 6,097,954 A | 8/2000 | Kumar et al. | |
| 6,141,762 A | 10/2000 | Nicol et al. | |
| 6,147,967 A * | 11/2000 | Ying et al. | 370/222 |
| 6,167,285 A | 12/2000 | Howe | |
| 6,192,230 B1 * | 2/2001 | van Bokhorst et al. | |
| 6,208,247 B1 | 3/2001 | Agre et al. | |
| 6,208,635 B1 | 3/2001 | Altvater et al. | |
| 6,275,477 B1 * | 8/2001 | Trompower et al. | |
| 6,285,892 B1 | 9/2001 | Hulyalkar | |
| 6,292,508 B1 | 9/2001 | Hong et al. | |
| 6,330,250 B1 | 12/2001 | Curry et al. | |
| 6,377,608 B1 | 4/2002 | Zyren | |
| 6,381,250 B1 | 4/2002 | Jacobson et al. | |
| 6,408,395 B1 * | 6/2002 | Sugahara et al. | |
| 6,414,955 B1 | 7/2002 | Clare et al. | |
| 6,415,330 B1 | 7/2002 | Okanoue | |
| 6,426,959 B1 | 7/2002 | Jacobson et al. | |
| 6,427,066 B1 | 7/2002 | Grube | |
| 6,437,692 B1 | 8/2002 | Petite et al. | |
| 6,466,608 B1 | 10/2002 | Hong et al. | |
| 6,501,999 B1 * | 12/2002 | Cai | |
| 6,502,206 B1 * | 12/2002 | Kosuge et al. | |
| 6,545,996 B1 | 4/2003 | Falco et al. | |
| 6,678,341 B1 * | 1/2004 | Miyake et al. | 375/356 |
| 6,798,744 B1 | 9/2004 | Loewen et al. | |
| 6,804,790 B2 | 10/2004 | Rhee et al. | |
| 6,909,905 B2 | 6/2005 | Umeda et al. | |
| 6,914,890 B1 | 7/2005 | Tobita et al. | |
| 7,089,344 B1 | 8/2006 | Rader et al. | |
| 7,302,465 B2 * | 11/2007 | Ayres et al. | 709/203 |
| 7,313,399 B2 | 12/2007 | Rhee et al. | |
| 7,590,086 B2 * | 9/2009 | Olkkonen et al. | 370/328 |
| 2001/0003191 A1 | 6/2001 | Kovacs et al. | |
| 2002/0012320 A1 | 1/2002 | Ogier et al. | |
| 2002/0018448 A1 | 2/2002 | Amis et al. | |
| 2002/0027894 A1 | 3/2002 | Arrakoski et al. | |
| 2002/0036987 A1 | 3/2002 | Garcia-Luna-Aceves et al. | |
| 2002/0045428 A1 * | 4/2002 | Chesson | |
| 2002/0059434 A1 * | 5/2002 | Karaoguz et al. | 709/228 |
| 2002/0061001 A1 | 5/2002 | Garcia-Luna-Aceves et al. | |
| 2002/0061009 A1 * | 5/2002 | Sorensen | |
| 2002/0067736 A1 | 6/2002 | Garcia-Luna-Aceves et al. | |
| 2002/0075941 A1 | 6/2002 | Souissi et al. | |
| 2002/0080768 A1 | 6/2002 | Garcia-Luna-Aceves et al. | |
| 2002/0085503 A1 | 7/2002 | Hulyalkar et al. | |
| 2002/0085526 A1 | 7/2002 | Belcea | |
| 2002/0089945 A1 | 7/2002 | Belcea | |
| 2002/0090979 A1 | 7/2002 | Sydor | |
| 2002/0101869 A1 | 8/2002 | Garcia-Luna-Aceves et al. | |
| 2002/0110105 A1 | 8/2002 | Awater et al. | |
| 2002/0131387 A1 | 9/2002 | Pitcher et al. | |
| 2002/0150075 A1 | 10/2002 | Belcea | |
| 2002/0154607 A1 | 10/2002 | Forstadius et al. | |
| 2002/0167960 A1 | 11/2002 | Garcia-Luna-Aceves et al. | |
| 2003/0018774 A1 * | 1/2003 | Flinck et al. | 709/223 |
| 2003/0037033 A1 * | 2/2003 | Nyman et al. | 707/1 |
| 2003/0041141 A1 * | 2/2003 | Abdelaziz et al. | 709/223 |
| 2004/0203936 A1 * | 10/2004 | Ogino et al. | |
| 2005/0037798 A1 | 2/2005 | Aaltonen et al. | |
| 2005/0088980 A1 * | 4/2005 | Olkkonen et al. | 370/255 |
| 2005/0132080 A1 | 6/2005 | Rhee et al. | |
| 2006/0285579 A1 | 12/2006 | Rhee et al. | |
| 2008/0019298 A1 | 1/2008 | Rudnick | |
| 2008/0062941 A1 | 3/2008 | Rhee et al. | |
| 2008/0307068 A1 * | 12/2008 | Willey et al. | 709/218 |

FOREIGN PATENT DOCUMENTS

| | | | |
|---|---|---|---|
| EP | 0 907 262 | | 4/1999 |
| GB | 2238147 | | 5/1991 |
| JP | 57089169 | | 6/1982 |
| JP | H03-38133 | | 2/1991 |
| JP | H05-257907 | | 10/1993 |
| JP | H06-337743 | | 12/1994 |
| JP | H11-007344 | | 1/1999 |
| JP | H11-202988 | | 7/1999 |
| JP | 2000-66776 | | 3/2000 |
| JP | 2001-237764 | | 8/2001 |
| WO | WO 98/35453 | | 8/1998 |
| WO | WO98/42153 | * | 9/1998 |
| WO | WO 00/62429 | | 10/2000 |
| WO | WO 02/39242 | | 5/2002 |

OTHER PUBLICATIONS

Office Action from U.S. Appl. No. 10/304,528 dated Sep. 7, 2007.
Office Action from U.S. Appl. No. 10/304,528 dated Apr. 18, 2008.
Notice of Allowance of U.S, Appl. No. 10/304,528 dated Jul. 29, 2008.
Examination Report of European Application No. 02789882.4 dated Apr. 27, 2009.
Supplemental Notice of Allowance of U.S. Appl. No. 10/304,528 dated Oct. 15, 2008.
Culler et al,, "A Network-Centric Approach to Embedded Software for Tiny Devices", Proc. of the First Int'l Workshop on Embedded Software (Oct. 8-10, 2001), Lecture Notes in Computer Science, vol. 2211. Springer-Verlag, London, pp. 114-130, 2001.
Office Action in Application No. JP2002-541499, dated Jan. 31, 2006.
Office Action in counterpart Application No. JP2003-548470, dated Jun. 10, 2008.
Naghshineh et al., "End-to End QoS Provisioning in Multimedia Wireless/Mobile Networks Using an Adaptive Framework", *IEEE Communications Magazine*, vol. 35(11), pp. 72-81 (Nov. 1997).*
Culler, et al., "A Network-Centric Approach to Embedded Software for Tiny Devices" University of California at Berkeley, Intel Research at Berkeley, Berkeley CA 94720, 2001.*
Gerla et al., "Landmark Routing for Large Ad Hoc Wireless Networks", Global Telecom. Conf., IEEE v.3, pp. 1702-1706 (2000).*
Goldsmith, A. et al., "Design Challenges for Energy-Constrained Ad Hoc Wireless Networks", IEEE Wireless Communications, pp. 8-27 (Aug. 2002).*
Greenberg, A. et al., "Design and Analysis of Master/Slave Multiprocessors", IEEE Transactions on Computers, 40(8):963-976 (1991).*
Hull, B. et al., "Poster Abstract: Bandwidth Management in Wireless Sensor Networks", ACM (SenSys'03), pp. 306-307 (2003).*
Perkins, C. et al., "Ad-Hoc On-Demand Distance Vector Routing", Proceedings of the 2nd IEEE Workshop on Mobile Computing Systems and Applications, pp. 90-100 (1999).*
International Preliminary Examination Report dated Feb. 24, 2004.
Woo et al., "A Transmission Control Scheme for Media Access in Sensor Networks" Department of EECS, Computer Science Division and Intel XIS Lab, University of California, Berkeley, 2001.
Poor, "Gradient Routing in Ad Hoc Networks" Media Laboratory, Massachusetts Institute of Technology, Cambridge, MA 02139, 2000.
Perkins et al., "Ad-hoc On-Dernand Distance Vector Routing" Sun Microsystems Lab, Advanced Development Group, Menlo Park, CA 94025, 1997.
Park et al. "A Highly Adaptive Distributed Routing Algorithm f or Mobile Wireless Networks" Naval Research Lab, USA, University of Maryland, USA, IEEE, 1997.
Royer et al., "A Review of Current Routing Protocols for Ad Hoc Mobile Wireless Networks" IEEE Personal Communications Apr. 1999.
Johnson et al "Dynamic Source Routing in Ad Hoc Wireless Networks" Computer Science Department, Carnegie Mellon University , 500 Forbes University, Pittsburgh, PA 15213-3891, 1996.

* cited by examiner

NETWORK PROTOCOL

CROSS-REFERENCE TO RELATED APPLICATION

This application is a continuation of U.S. patent application Ser. No. 12/264,703, filed Nov. 4, 2008, entitled, "Network Protocol," which is a continuation of U.S. patent application Ser. No. 10/304,528 filed Nov. 26, 2002, entitled, "Network Protocol," now U.S. Pat. No. 7,522,563, which claims priority to U.S. Provisional Application No. 60/333,894, filed on Nov. 28, 2001, the contents of the above-identified applications are hereby incorporated by reference into this application as if set forth herein in full.

TECHNICAL FIELD

This application relates generally to a network protocol for use with an ad hoc wireless network and, more particularly, to a network protocol that reduces power and bandwidth consumption among nodes of the network.

BACKGROUND

An ad hoc wireless network is a self-organizing network in which network devices themselves establish communication links with one another. Ad hoc wireless networks may be used in different settings. For example, an ad hoc wireless network may be established between monitoring and control devices and a host computer.

In one example, the monitoring and control devices monitor electrical systems, such as a building lighting system or fire alarm system. The monitoring and control devices report status information from their monitored system to the host computer. In response, the host computer sends control commands, which the monitoring and control devices use to control their electrical systems.

There are numerous issues involved in establishing and maintaining an ad hoc wireless network, not the least of which is power consumption. Network devices on an ad hoc wireless network typically run off of batteries, which must be checked and changed periodically. Changing batteries frequently can be inconvenient, particularly in cases where nodes of the wireless network include numerous small devices located in hard-to-reach areas.

Other issues relating to establishing and maintaining an ad hoc wireless network include, but are not limited to, delays in establishing the ad hoc wireless network, network traffic congestion resulting in poor data throughput, and data collisions caused by various devices trying to transmit data in (or around) a same time slot.

SUMMARY

In general, in one aspect, the invention is directed to a system that includes wireless network devices and a terminal device. The wireless network devices include a base station and plural repeater devices for routing data. The terminal device runs a network protocol to establish a presence in a wireless network that includes the wireless network devices. The terminal enters a low-power mode when not communicating over the wireless network. This aspect of the invention may include one or more of the following.

In establishing a presence in the wireless network, the terminal device may send communications to the wireless network indicating a presence of the terminal device, and may receive confirmation from the wireless network. For example, the terminal device may send a first communication to the wireless network, await a first confirmation message from the wireless network in response to the first communication, send a second communication to the wireless network if the first confirmation message is received (the second communication being larger than the first communication), await a second confirmation message from the wireless network in response to the second communication, send a third communication to the wireless network if the second confirmation message is received (the third communication being larger than the second communication), and await a third confirmation message from the wireless network in response to the third communication.

The first communication may include an identifier for the wireless network. The second communication may include an identifier for the terminal device and an identifier for a node on the wireless network With which the terminal device would like to communicate. The third communication may include parameters associated with the terminal device. The parameters may include, but are not limited to, status of input/output channels on the terminal device and a data packet generation rate of the terminal device.

In establishing a presence on the wireless network, the terminal device may send N (N>1) communications to the wireless network. Each of the N communications following a first one of the N communications may include more data than an immediately preceding one of the N communications. The terminal device may receive a confirmation message following each of the N communications. The terminal device may send each of the N communications following the first one of the N communications only if the terminal device receives a confirmation message in response to an immediately preceding one of the N communications.

In establishing a presence on the wireless network, the terminal device may establish plural master nodes. The plural master nodes may include other devices on the wireless network. At least one of the plural master nodes may mediate access of the terminal device to the wireless network. In establishing the plural master nodes, the terminal device may identify N (N>1) devices on the wireless network having fewest numbers of hops from the terminal device to the base station, and may store data corresponding to the N devices in memory.

The plural master nodes may include two master nodes, one of which is designated as the primary master node and the other of which is designated as the secondary master node. The terminal device may communicate with the wireless network via the primary master node and via the secondary master node if there is a problem with the primary master node. The primary master node may have fewer hops from the terminal device to the base station than does the secondary master node. At least one of the plural master nodes may store data from the wireless network. The terminal device may receive the data from the at least one of the plural master nodes.

The terminal device may monitor data traffic on the wireless network, and change a rate at which the terminal device sends data to the wireless network based on the data traffic on the wireless network. In monitoring data traffic on the wireless network, the terminal device may compare response times of repeater devices on the wireless network to a predetermined response time and/or use carrier sense multiple access (CSMA) protocol to monitor data traffic in a channel of the wireless network. The terminal device may reduce a rate at which the data is sent to the wireless network if data traffic on the wireless network exceeds a predetermined level.

The terminal device may monitor data traffic on the wireless network to detect data packet collisions. If a data packet collision is detected on the wireless network, the terminal device may wait a random period of time before sending data to the wireless network. The random period of time may be based on hardware noise on the wireless network. The terminal device may determine the random period of time by counting hardware noise pulses on a channel of the wireless network.

The terminal device and repeater device(s) may check a channel multiple times prior to sending data over the wireless network—waiting a period between each of the multiple times, increase the period following the multiple times resulting in an increased period, and then check the channel multiple times prior to sending data over the wireless network—waiting the increased period between each of the multiple times. The period may correspond to an exponential curve and increasing the period may include changing the exponential curve. The period may be increased based on traffic on the wireless network. Checking and increasing the period may be performed in a media access control layer of a network protocol stack.

The terminal device may send data to the wireless network, detect a collision in a time slot of a channel of the wireless network, and shift a time at which the data is sent to the wireless network so as to avoid the collision. The terminal device may send the data periodically and shift the time at which the data is sent in each period.

The terminal device may assign a priority to data sent to the wireless network. The terminal device and at least one of the plural repeater devices may transmit the data based on the priority. Transmitting the data based on the priority may include changing a length of a time slot assigned to the data and/or transmitting higher priority data before lower priority data. Changing the length of the time slot may include extending the length of the time slot for higher priority data.

At least one of the plural repeater devices may establish plural master nodes. The plural master nodes may include devices on the wireless network. At least one of the plural master nodes may provide a path for transmission of data over the wireless network. In establishing the plural master nodes, a repeater device may identify N (N>1) devices on the wireless network having fewest numbers of hops to the base station, and store data corresponding to the N devices in memory. The plural master nodes may include a primary master node and a secondary master node. The repeater device may communicate over the wireless network via the primary master node and via the secondary master node if there is a problem with the primary master node. The primary master node may have fewer hops to the base station than does the secondary master node.

Other features and advantages of the invention will become apparent from the following description, including the claims and drawings.

DESCRIPTION

Figure 1:
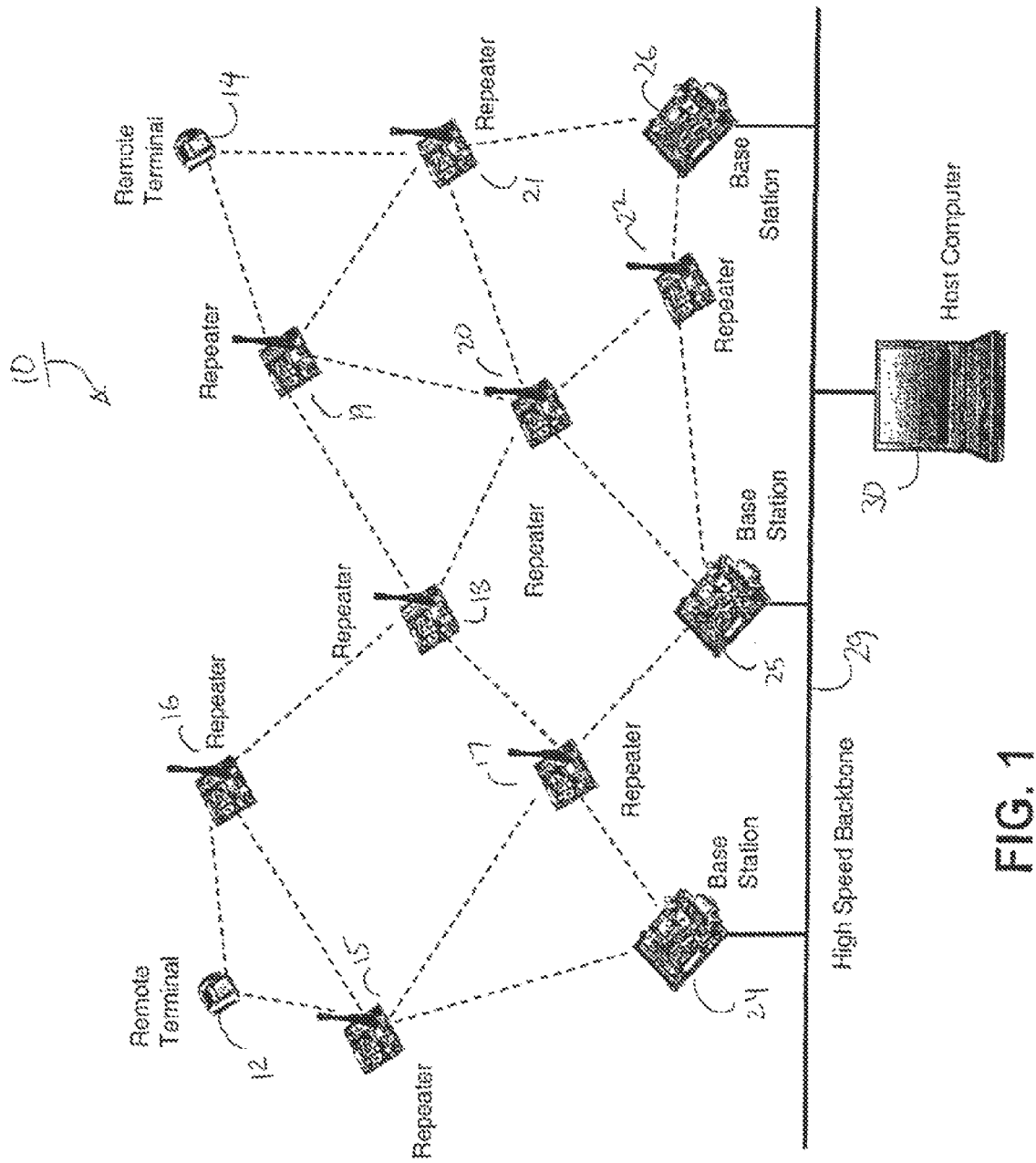
FIG. 1 a block diagram of a wireless network on which the protocol described herein may be implemented.

Described herein is a protocol for routing data in an ad-hoc wireless network, such as wireless network 10 (FIG. 1). The protocol enables data to be routed among various network devices using bi-directional wireless radio frequency (RF) links, which are depicted as dotted lines in FIG. 1. Wired links are depicted as solid lines.

Wireless network 10 is a heterogeneous network, since all of the devices on wireless network 10 are not capable of performing the same functions. In this regard, wireless network 10 includes remote terminals 12 and 14, repeaters 15 to 22, and base stations 24 to 26. Remote terminals 12 and 14 and repeaters 15 to 22 communicate via RF links. Base stations 24 to 26 communicate to the repeaters via RF links and are wired to a high-speed backbone 29, through which base stations 24 to 26 communicate with a host computer 30 at a relatively high speed.

Each of remote terminals 12 and 14, repeaters 15 to 22, and base stations 24 to 26 defines a node of wireless network 10. Each of these devices includes a memory (not shown) that stores executable instructions and one or more processors (riot shown) for executing the instructions to perform the functions described herein. In this embodiment, the structure and function of remote terminals 12 and 14 are the same; the structure and function of repeaters 15 to 22 are the same; and the structure and function of base stations 24 to 26 are the same. This may not be the case in other embodiments.

A remote terminal is either a source or a destination of network data, but does not forward data for other source or destination devices. One or more sensing devices may be connected to a remote terminal. These sensing device(s) may be used to monitor physical systems, as described in the Background section above. The remote terminal acquires analog or digital signals from the sensing device(s) and transmits these signals to a base station through wireless network 10. An antenna (not shown) may be included on each remote terminal to effect transmission. Antennas may also be included on the other wireless devices.

One or more actuators may also be connected to a remote terminal. The remote terminal may use analog or digital command signals to command the actuator(s). These command signals may originate in the remote terminal or in host computer 30. In the latter case, the command signals may be transmitted from host computer 30, to a base station, and then to the remote terminal, either directly or through one or more repeaters in wireless network 10.

A repeater is an intermediate node of wireless network 10 that forwards data sent by remote terminals, other repeaters, and/or base stations. Repeaters typically send the data in the format that the data is received and at the same rate as the data is received.

A base station is a node of the wireless network that is connected to high-speed backbone 29. Base stations act as the intermediaries between wireless network 10 and backbone 29, performing any necessary data and protocol conversions to permit data exchange between the two.

Host computer 30 is also connected to high-speed backbone 29. Host computer 30 supervises wireless network 10 and performs tasks that include receiving and processing data generated by remote terminals and issuing command signals to the remote terminals.

Since the remote terminals are connected to sensing devices and/or actuators, their placement in the network depends on the installation requirements of the sensing devices and actuators. The repeaters are placed to establish connectivity between the remote terminals and base stations. The only requirement in forming ad hoc wireless network 10 is that every remote terminal should be within the RF transmission range of a base station or a repeater, and every repeater should be within the RF transmission range of a base station or another repeater. Devices outside of their RF transmission range are not able to talk to each other over wireless network 10.

The overall topology of wireless network 10 resembles a spanning forest, in which the remote terminals function as leaves, the repeaters function as branches, and the base stations function as roots. Like in a dense forest where trees can overlap, communication links among repeaters mesh to form a web-like structure, which enables the remote terminals (leaves) and repeaters (branches) to communicate with multiple base stations (roots).

In a traditional spanning tree network, a single root node broadcasts "hello" messages to grow a network tree. In the protocol described herein, the formation of a forest-like network is based on "hello" messages initiated by the remote terminals (the leaves). This process is referred to herein as "terminal-initiated polling".

One advantage of terminal initiated polling is that a remote terminal does not need to stay in an active, listening mode for a long period of time in order to respond to a hello message or join the network. Most of the time, the remote terminal can stay in a low-power mode, generally called "sleep mode", and "wake-up" only when the remote node wants to join the network and/or to send a data packet over the network. Thus, the duty cycle of a remote terminal can be kept at a relatively low level, resulting in reduced remote terminal power consumption.

Reduced power consumption for remote terminals is advantageous, since remote terminals are often powered by low-capacity, small-size batteries, such as lithium coin cell batteries. Long life for batteries such as this can generally only be achieved when average power consumption of a remote terminal is relatively low.

Figure 2:
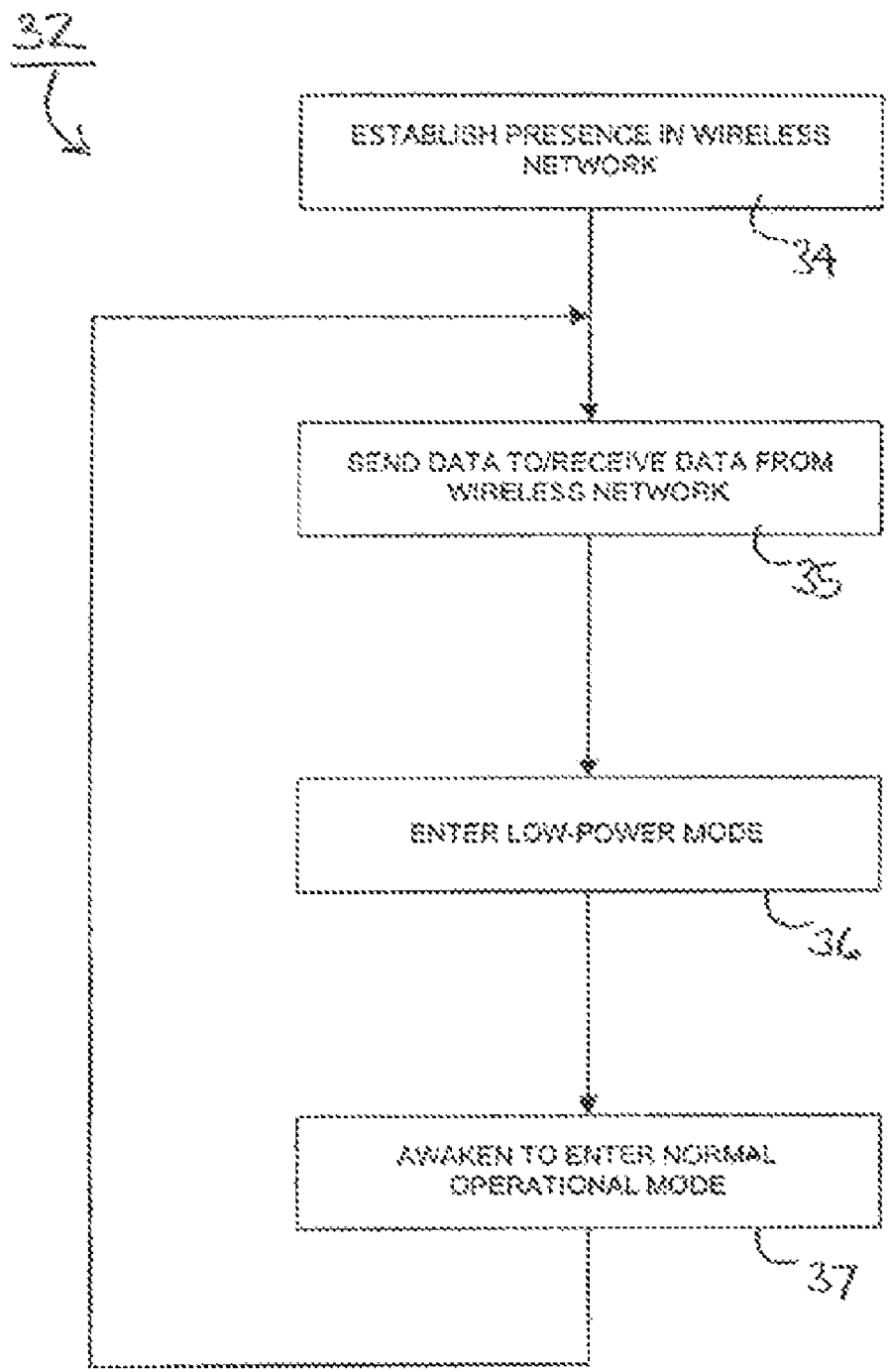
FIG. 2 is a flowchart showing a process for establishing a presence in the wireless network.

Referring to FIG. 2, a process 32 is shown for achieving reduced power consumption of remote terminals of a wireless network. Process 32 may be performed by a remote terminal 12 on wireless network 10.

Process 32 includes remote terminal 12 establishing (34) a presence in a wireless network. In this context, establishing a presence in a wireless network can include entering a pre-existing wireless network and/or initiating establishment of a new wireless network. Processes for performing these functions are described in detail below in the sections entitled "Terminal-Initiated Polling", "Establishing Master Nodes", and "Progressive Search".

Once remote terminal 12 establishes a presence in wireless network 10, remote terminal 12 may send data to, or receive data from, (35) wireless network 10. Processes for sending and receiving data are described below in the sections entitled "Adaptive Duty Cycle Adjustment", "Using Hardware Noise To Generate Random Numbers", "Adaptive Exponential Back-off", "Dynamic Channel Time Slot Assignment", and "Packet Prioritization". The processes described in these sections may be performed individually or two or more of them may be performed in combination. Likewise, these processes may be performed in conjunction with process 32 or independently thereof.

Referring back to FIG. 1, remote terminal 12 enters (36) a low-power mode when not communicating over wireless network 10. During this low-power mode, remote terminal 12 may maintain some low-level operations; however, major processing functions are curtailed in order to conserve power. Following the low-power mode, remote terminal 12 "wakes-up", i.e., enters (37) its normal operational mode. During this normal operational mode, remote terminal 12 is again able to send/receive (35) data over network 10.

It is noted that remote terminal 12 may always enter the low-power mode whenever it is not communicating over wireless network or it may maintain its normal operational mode during some periods of non-communication.

Terminal-Initiated Polling

There is no connectivity among devices of a wireless network until at least one remote terminal initiates communication, i.e., sends a hello message. Communication may be initiated when a remote terminal, such as remote terminal 12, is first activated. That is, when remote terminal 12 is first activated, remote terminal 12 broadcasts a hello message to interrogate its surroundings. As used herein, the term "broadcast" means to send (or transmit) to one or more other network devices.

The hello message is a specialized data packet and is therefore also referred to as a "hello packet". The hello packet may contain information, such as the identity of the remote terminal and a request to enter the wireless network. All repeaters within the RE transmission range (typically 30 to 100 feet, but extendable to a higher value) of the remote terminal re-broadcast the hello packet to seek connections with base stations or other repeaters within their RF transmission range. The repeaters re-broadcast the hello packet until the hello packet reaches all of the base stations 24 to 26. This technique of propagating the hello packet through the network is known as "flooding" the network.

When a base station receives a hello packet, the base station responds by generating and broadcasting a confirmation packet. The confirmation packet is also propagated throughout the entire wireless network 10 by flooding. Eventually, the confirmation packet reaches the remote terminal that initiated the hello message. At this point, communication among the network nodes is possible.

Along the route that the confirmation packet takes to through wireless network 10, repeaters keep track of which node sent them the confirmation packet, i.e., an immediately preceding network node along the route. Each repeater stores a pointer in memory that points to this node. The pointers enable the repeaters to identify neighboring nodes that can be used in transporting a data packet closer to a base station. These neighboring nodes are referred to as master nodes, or simply "masters".

One characteristic of flooding a communication network is that nodes in the network may receive multiple copies of a confirmation packet. Thus, a repeater may establish more than one pointer, each pointing to a sender that sent a copy of the confirmation packet. These senders of confirmation packet are designated as master nodes, resulting in single device having multiple masters in at least some cases. One advantage to a device having multiple masters is that the device has more than one route to forward data packets to the base stations, thus increasing overall network reliability.

When a remote terminal sends a data packet toward host computer 30 along a particular route, a confirmation packet is issued at every link from the receiving node to the la sending node. With such node-to-node confirmation, end-to-end network confirmation is no longer needed, resulting in highly responsive network communication.

A specific example of terminal-initiated polling will now be described with respect to FIG. 1. Initially, there is no remote terminal active in FIG. 1. Thus, there is no connectivity among the repeaters and base stations. When remote terminal 12 is activated, remote terminal 12 broadcasts a hello packet. Only those devices within RF transmission range of remote terminal 12, namely repeaters 15 and 16, are able to receive the hello packet.

Since no connectivity exists among repeaters and base stations at this point, repeaters 15 and 16 are unable to respond to the hello packet. Instead, repeaters 15 and 16 re-broadcast the hello packet to obtain responses from their own neighbors within RF transmission range. The hello packet propagates through the network in this manner, eventually reaching each of base stations 24 to 26. The base stations are likely reached at different times.

Base stations 24 to 26 respond to the hello packet by flooding the wireless network with confirmation packets. These confirmation packets eventually reach remote terminal 12. During propagation, each node of the network stores relationships to other nodes on the network, thereby establishing connectivity between remote terminal 12, the repeaters, and the base stations.

A process for storing the relationships and establishing master nodes during propagation is described below in "Establishing Master Nodes", continuing with the foregoing example.

Establishing Master Nodes

Upon receiving a hello packet sent, e.g., by repeater 15, base station 24 generates and broadcasts a confirmation packet. Repeaters 15 and 17 receive this confirmation packet, since they are within the RF transmission range of base station 24. The confirmation packet includes an identification number of base station 24 and a distance field that indicates how many hops the sender of the confirmation packet is from base station 24. Confirmation packets sent by a base station have "0" in the distance field, since a base station is the sender.

When repeater 15 receives the confirmation packet from base station 24, repeater 15 increments the distance field of the confirmation packet by "1", storing the resultant distance (in this case "1") in its cache, along with the identity of base station 24. This distance is the number of hops from the repeater to base station 24. Repeater 15 also designates the sender, in this case base station 24, as its master node. Repeater 15 stores data in its cache indicating that base station. 24 is its master.

Before a repeater acknowledges 4 confirmation packet, the repeater must first broadcast a hello packet. This allows every repeater to explore its neighborhood (i.e., its RF transmission range) in order to identify multiple (e.g., all) paths to host computer 30. Accordingly, if repeater 17 (for example) receives a confirmation packet from base station 24 before repeater 17 has had a chance to broadcast an initial hello packet, repeater 17 ignores the confirmation packet. In this case, repeater 17 broadcasts its own copy of the hello packet to base station 24.

Upon receiving the hello packet from repeater 17, base station 24 responds with another confirmation packet. Repeater 17 can then process this confirmation packet in the same manner as repeater 15 processed its confirmation packet from base station 24.

As noted, a master node is defined as a next-hop node to which a packet is to be forwarded for delivery to a base station. Repeaters 15 and 17 thus store pointers in their caches that point to base station 24 as their master node. In addition, repeaters 15 and 17 re-broadcast the confirmation packet to inform their neighbors of their connectivity with, and their distances to, base station 24. This propagation process continues until every repeater in wireless network 10 has broadcasted a hello packet and received a confirmation packet.

As was the case with base station 24, base station 25 also receives hello packets from its neighboring repeaters, and broadcasts confirmation packets in response. Upon receiving a confirmation packet from base station 25, repeater 17 increments the distance field in the confirmation packet and recognizes base station 25 as another master. As noted, the multiple master configuration is particularly advantageous in an ad-hoc wireless network, since an RE link between any two nodes can be easily interfered with and/or fail. The multiple master configuration also provides a node with more than one path for forwarding a data packet to its destination.

Figure 3:
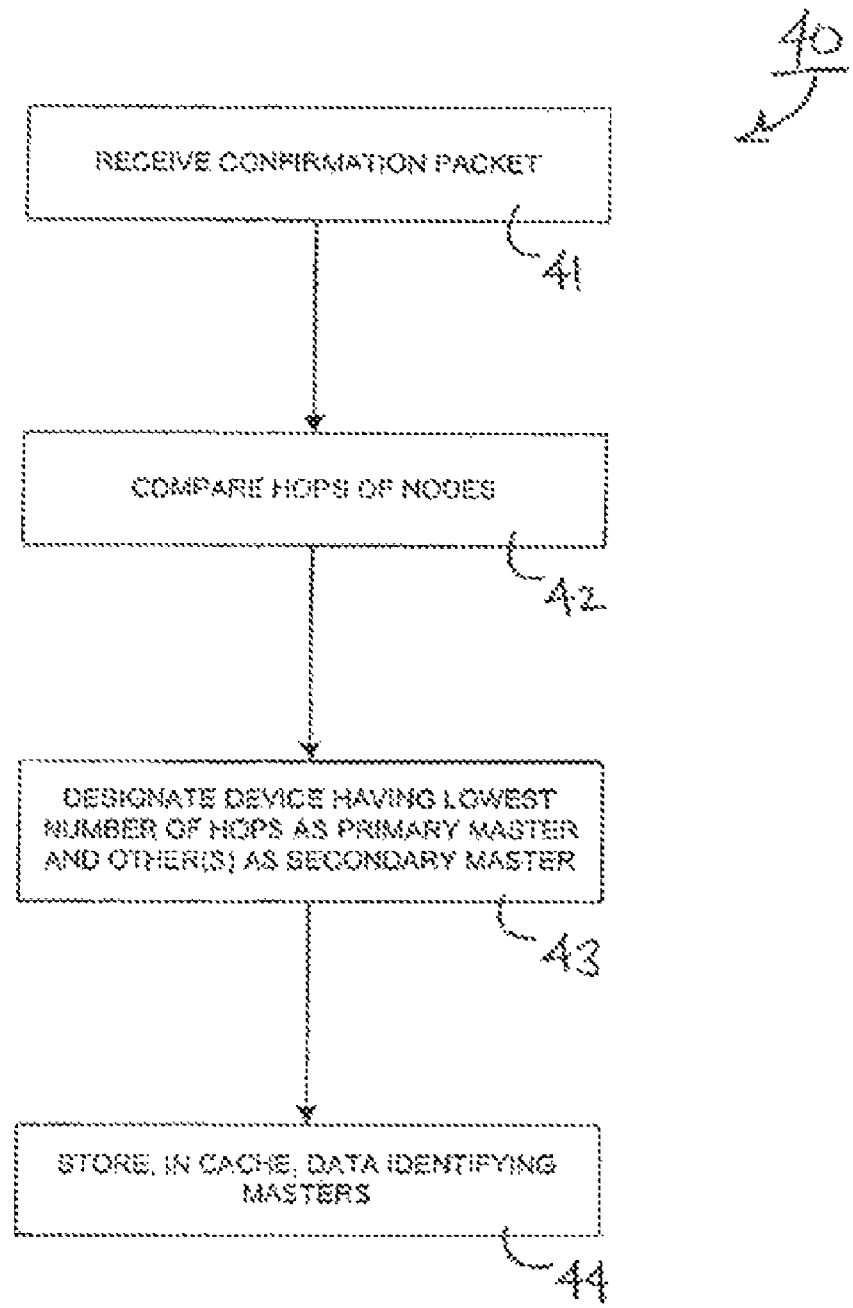
FIG. 3 is a flowchart showing a process for establishing master nodes in the wireless network.

Referring to FIG. 3, in process 40 the confirmation packet reaches remote terminal 12 via repeater 15. Once remote terminal 12 receives (41) the confirmation packet, remote terminal 12 recognizes repeater 15 as its master. Since remote terminal 12 is located within the transmission range of repeater 16, remote terminal 12 also receives (41) the confirmation packet from repeater 16. Remote terminal 12 thus also recognizes repeater 16 as its master.

After receiving confirmation packets from repeaters 15 and 16, remote terminal 12 compares (42) the distance fields of the two confirmation packets. Remote terminal 12 designates (43) repeater 15 to be its primary master, since repeater 15 is closer to any base station (in this case, to base station 24) than repeater 16. Remote terminal 12 designates (43) repeater 16 as its secondary master.

If remote terminal 12 later determines that the RF link to repeater 15 is not reliable and/or often needs re-transmission, remote terminal 12 may designate repeater 16 as its primary master if repeater 16 provides a better link. Pointers to repeaters 15 and 16 are stored (44) in memory on remote terminal 12, together with data indicating their status as primary and secondary masters.

It is noted that remote terminal 12 may designate more than two repeaters (or base stations, as the case may be) as its masters. For example, one repeater may be designated as primary master, another as secondary master, another as tertiary master, and soon.

Master nodes store data for transmission to their "slave" nodes. For example, repeaters 15 and 16 store data destined for remote terminal 12 while remote terminal 12 is in low-power mode. When remote terminal 12 "awakens" (following a low-power mode period), remote terminal 12 may send a hello packet to repeaters 15 and 16. In response to this hello packet, repeaters 15 and 16 transmit the stored data to remote terminal 12.

It is noted that when a target repeater receives multiple confirmation packets from its neighboring repeaters, the target repeater also compares the distance fields of those confirmation packets and designates one network device as its primary master and other(s) as secondary master(s). For instance, repeater 21 may receive confirmation packets from repeater 20 and base station 26. In the packet sent by repeater 20, the distance field is "1", since repeater 20 is one hop away from base station 25. However, the distance field in the packet sent by base station 26 is "0". Therefore, repeater 21 designates base station 26 as its primary master and repeater 20 as its secondary master. During subsequent data transmission, if the RF link between repeater 21 and base station 26 becomes unreliable, repeater 21 may designate repeater 20 as its primary master, in the process demoting repeater 20 to secondary master status.

As noted, formation of wireless network 10 is initiated by a single remote terminal sending a hello packet. After the network is formed, data is routed between remote terminals and the host computer collectively by all repeaters using a distributed routing algorithm.

Starting from the source of the data packet, a node selects its primary master as the next-hop node. After every transmission from one node to another node (a hop), the receiving node immediately issues a confirmation packet back to the sender. If no confirmation reaches the sender after a certain amount of time, the sender will re-transmit, the same data packet. After several attempts at re-transmission without success, the sender will select an alternative master, if it exists in the sender's cache, as the next-hop node. With node-to-node confirmation and multiple choices of next-hop node, any broken or unreliable link can be quickly detected, and an alternative route can be established quickly, resulting in a reliable and responsive routing process.

When a new remote terminal, such as remote terminal 14, wants to join wireless network 10, remote terminal 14 issues a hello packet. The hello packet from remote terminal 14 reaches repeaters 19 and 21. Since these two repeaters have already established routes to base stations, each of repeaters 19 and 21 responds to remote terminal 14 with a confirmation packet. Remote terminal 14 compares the distance fields of the two confirmation packets and designates repeater 21 as its primary master, since repeater 21 is only one hop away from base station 26. Repeater 19 is designated secondary master.

It is well known that radio devices consume a fair amount of power even when they are only in the listening mode. In a traditional spanning-tree network, remote terminals must stay in listening mode at all times in order to respond to beacon signals initiated by a central coordinator. With terminal-initiated polling, a remote terminal does not need to waste power listening to periodic beacon signals. Instead, the remote terminal can stay in low-power mode much of the time and wake-up occasionally according to its own transmission schedule.

Another advantage of terminal-initiated polling is that a remote terminal need not wait to join a wireless network. That is, since the remote terminal initiates entry into the wireless network, the remote terminal controls when it establishes a presence in the wireless network. The remote terminal is not required to wait for a periodic beacon signal from a base station before joining.

Progressive Search

As noted above, in terminal-initiated polling, a remote terminal broadcasts an initial hello packet in order to establish a presence in wireless network 10. Instead of broadcasting a single packet, the remote terminal may broadcast a series of progressively larger packets, each containing more data than its immediate predecessor, in order to establish a presence in wireless network 10.

One advantage of this approach is that the remote terminal does not waste power on sending multiple copies of a lengthy hello packet when there is no device in its RF transmission range to respond. A remote terminal thus consumes power to transmit a full hello packet only when it confirms that there is a route to an intended destination and one of its neighbors knows the route. The progressive transmission approach also results in increased bandwidth usage efficiency, since only copies of a first short hello packet initially occupy communication channels.

Figure 4:
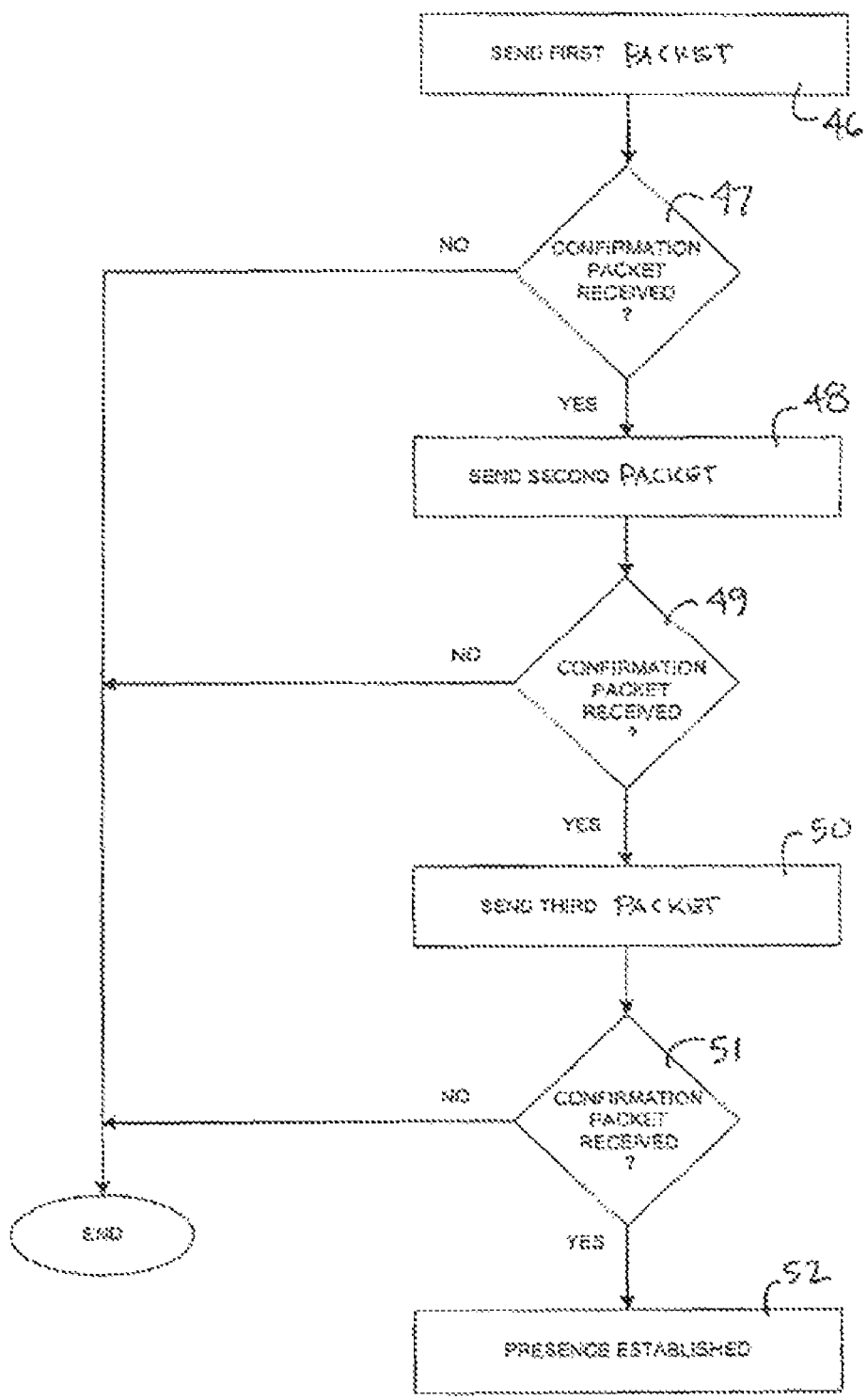
FIG. 4 is a flowchart showing a process for establishing a presence in the wireless network by sending out progressively larger hello data packets.

Referring to FIG. 4, when a new remote terminal attempts to join wireless network 10 (or when a remote terminal wakes-up after being in low-power mode for a long period of time), the remote terminal first sends (46) a small hello packet to determine if there are any repeaters or base stations in its RF transmission range (i.e., its neighborhood) that belong to the same network (multiple wireless networks may overlap in the same physical space). This initial hello packet may contain only the network or group identification (ID) number to which the remote terminal belongs or with which the remote terminal would like to communicate. In one embodiment, this initial hello packet may be about 1 ms (millisecond) in duration.

The remote terminal waits for a confirmation packet in response to its initial hello packet. If the confirmation packet is not received (47), the remote terminal does not proceed with broadcasting progressively larger packets.

If the remote terminal receives (47) a confirmation packet in response to its initial hello packet (the confirmation packet also about 1 ms in duration), the remote terminal sends (48) a second data packet that includes different data, such as the identification (ID) number of the network node with which the remote terminal would like to communicate. In one embodiment, this second data packet may be about 2 ms to 3 ms in duration.

The remote terminal waits for a confirmation packet in response to the second data packet. If the confirmation packet is not received (49), the remote terminal does not proceed with broadcasting a larger data packet.

If the remote terminal receives (49) a confirmation packet in response to the second data packet, and the confirmation packet confirms a route to the packet's destination, the remote terminal sends (50) a third data packet. The third data packet includes parameters is associated with the remote terminal, such as the status of input/output channels on the remote terminal and its data packet generation rate. In one embodiment, the third data packet may be about 5 ms to 6 ms in duration.

Once the third date packet is sent (50), and a confirmation packet in response thereto is received (51), the remote terminal's presence is established (52) in wireless network 10. Although the "progressive search" technique described here uses three-packet transmissions to establish connection, any number of packet transmissions may he used. For example, two packet transmissions may be used or four or more packet transmissions may be used.

Adaptive Duty Cycle Adjustment

If a remote terminal senses significant congestion on wireless network 10, the remote terminal may change its data transmission rate based on the amount of congestion. For example, the remote terminal may decrease its data transmission rate. If enough remote terminals on the network decrease their data transmission rates, overall network congestions will decrease accordingly.

Figure 5:
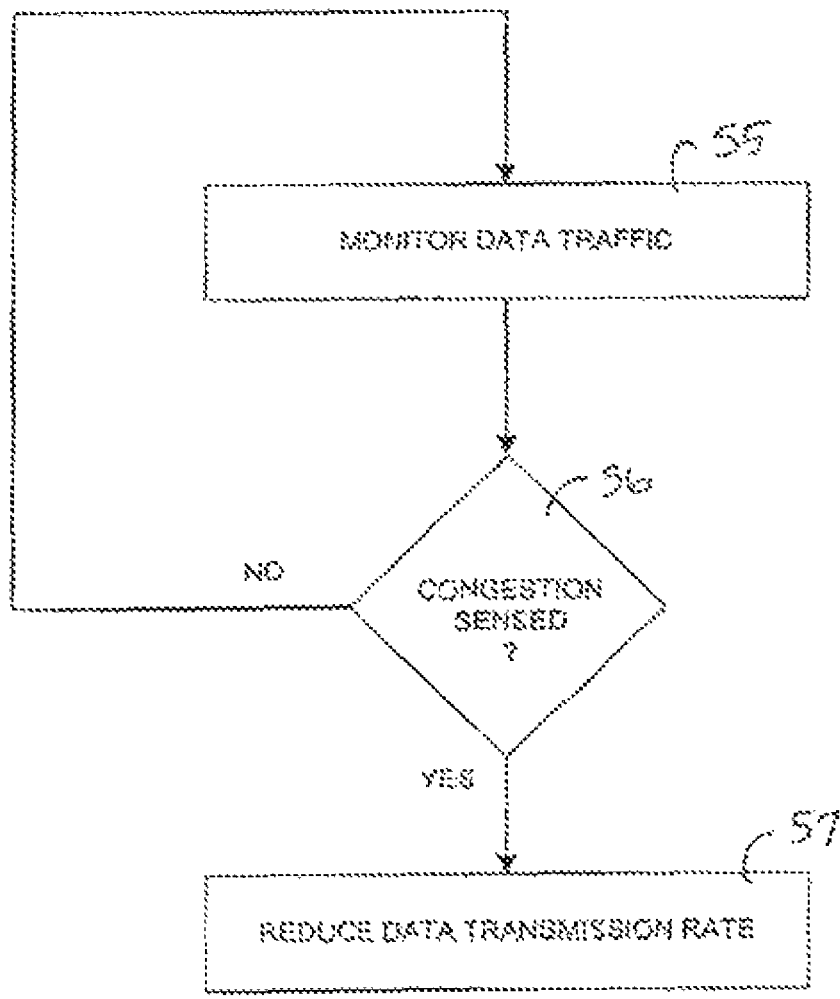
FIG. 5 is a flowchart showing a process for adaptively changing the data transmission rate of a network node.

Referring to FIG. 5, a remote terminal 12 monitors (55) data traffic on wireless network 10. The remote terminal may sense (56) congestion on wireless network 10 based on the amount of time it takes for the remote terminal to receive a confirmation packet. That is, typically, a remote terminal receives a confirmation packet within 1 ms of sending a data packet. In this embodiment, if 60% of the time the remote. terminal does not receive a confirmation packet within 3 ms after sending a data packet, the remote terminal searches for less busy nodes (i.e., another master) over which to send the data packet. These numbers may be adjusted. For example, the 60% number above may be 30%, 70% or any value in between. The 3 ms duration may also be adjusted, as appropriate.

If the remote terminal cannot find any less busy nodes, the remote terminal reduces its data transmission rate (57). The more congestion that is on the network, the larger the reduction in the data transmission rate. For example, the data transmission rate may be reduced by 50%, although other reductions may be effected.

A remote terminal may also sense (56) congestion on the network using carrier sense multiple access (CSMA). CMSA is the channel access method used by devices on wireless network 10. According to (CSMA), before a network node, such as a remote terminal, attempts to send a data packet over a communication channel, the network node first determines if the communication channel is busy, i.e., radio Signals are already being transmitted over, the communication channel. If the communication channel is busy, the network node will "back-off" (i.e., not attempt transmission) and wait for a certain period of time before making another attempt at transmission.

If the remote terminal is forced to back-off a certain percentage of time, e.g., 60%, the remote terminal decides that the network is overly congested. The remote terminal thus reduces (57) its data transmission rate based on the amount of congestion. Greater congestion leads to greater transmission rate reductions and vice versa.

When decreasing its data transmission rate, the remote terminal may wait for a longer period of time before re-transmitting a data packet. During this waiting period, the remote terminal may enter low-power mode. Thus, the remote terminal also reduces its duty cycle when traffic is congested. When the transmission success rate increases as traffic becomes less congested, the remote terminal may automatically shorten its waiting period to provide a higher data packet transmission rate.

Using Hardware Noise to Generate Random Numbers

Figure 6:
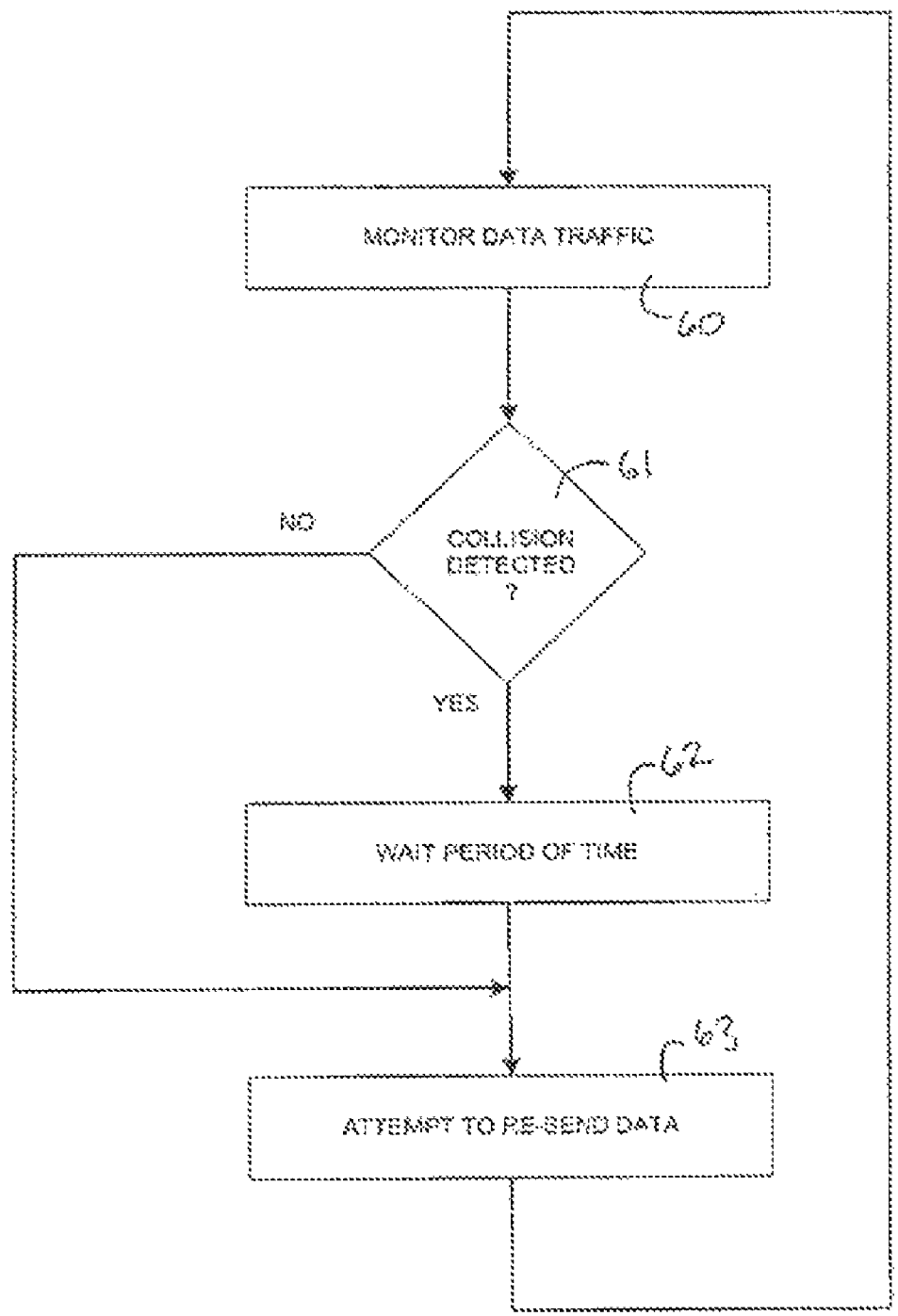
FIG. 6 is a flowchart showing a process for use in avoiding data packet collisions on the wireless network by randomizing data packet transmission times using hardware noise to determine a randomizing factor.

Referring to FIG. 6, remote terminal 12 monitors (60) wireless network 10 for collisions. When there is a collision on the network, a remote terminal that originated a colliding transmission does not receive a confirmation packet within a predetermined period of time (e.g., 3 ms). This is how remote terminals know that a collision has occurred. It a collision is detected (61), remote terminals involved in the collision wait (62) for an amount of time then attempt (63) to re-send their data packets. This process may be repeated a finite number of times. To reduce the possibility of another collision during re-transmission of the data packets, the re-transmission waiting time of each remote terminal is randomized.

In this embodiment, hardware RF noise on a channel of the wireless network is used, to determine the random waiting period for re-transmission. The RF noise is mostly white Gaussian noise caused by thermal fluctuations in air surrounding the wireless device antennas. The RF noise on the channel is digital, meaning that the noise is characterized by pulses that are determined to have a "1" value or a "0" value. To generate the random number, each remote terminal counts the number of pulses over a predetermined period of time (e.g., over 4 ms, starting when the terminal fails to receive its confirmation). The resulting random numbers are converted to corresponding unique randomized waiting periods.

In this embodiment, each remote terminal includes a counter that counts between "0" and "255", re-starting when it reaches "255". The number that results following the predetermined period of time is the random number.

This process for generating the random number based on hardware noise is performed in the media access control (MAC) layer of the international Standard Organization's Open System Interconnect (ISO/OSI) network protocol stack.

In traditional networks, devices generate random numbers for producing waiting periods based on software-implemented mathematical algorithms. Random numbers generated by software-implemented mathematical algorithms are not true random numbers; rather, they are pseudo-random numbers that mimic the probability distribution functions of true random numbers. These software-implemented mathematical algorithms sometimes result in the same pseudo-random number being generated by both network devices, if the same initial state for the software-implemented mathematical algorithms is used in both devices. This can result in repeated packet collisions. Using the hardware RF noise to generate the random number results in fewer cases where the same random number is generated by both network devices (remote terminals), thereby resulting in fewer repeated packet collisions.

It is noted that the process shown in FIG. 6 may be performed by any device on wireless network 10.

Adaptive Exponential Back-Off

Devices on wireless network 10 use CSMA to access communication channels. As noted, according to CSMA, before a network device, such as a remote terminal, repeater, or base station, attempts to send a data packet over a communication channel, the network device first checks to see if the communication channel is busy.

Figure 7:
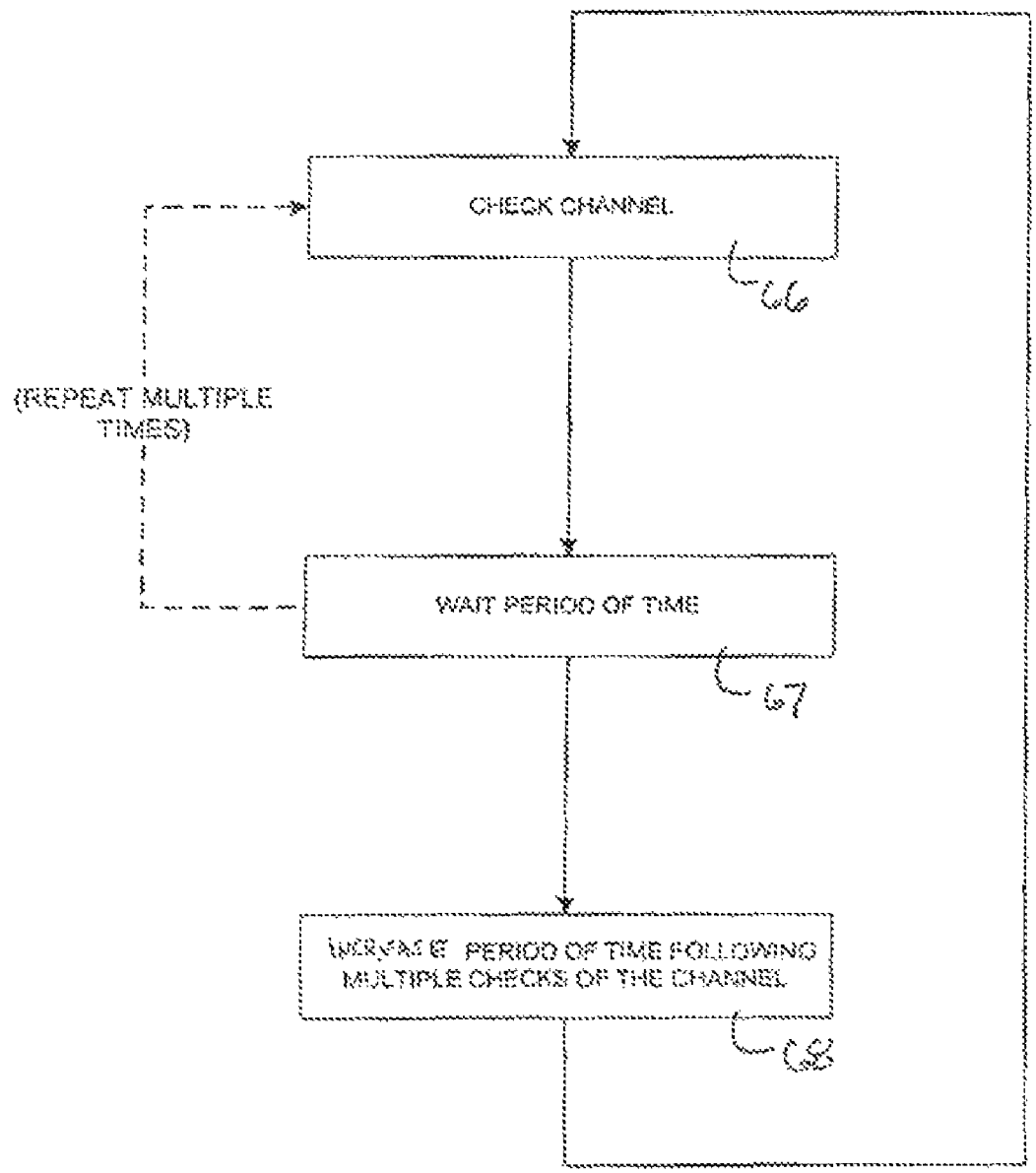
FIG. 7 is a flowchart showing a process for adaptively varying the "back-off" time of a device attempting to transmit data over the wireless network.

Referring to FIG. 7 a network device checks (66) a communication channel multiple Limes prior to attempting to send data over the wireless network. The network device waits (67) a period of time between each check. If, after each check, the communication channel is busy, the network device will "back-off" (i.e., not attempt transmission) and wait for a certain period of time before making another as attempt at transmission. At the end of the back-off period, the network device again listens for signals on the communication channel. This process is repeated until the communication channel is not busy.

The back-off mechanism described here is used to reduce data collisions in a dense wireless network that uses CSMA, and may be implemented on any of the network devices shown in FIG. 1. A general guideline for implementing the back-off mechanism is to randomize the back-off period among network devices so that the probability that two or more devices will listen and transmit data packets at exactly the same time is low. In this embodiment, this is done by increasing (68) the waiting period following a predetermined number of checks.

Figure 8:
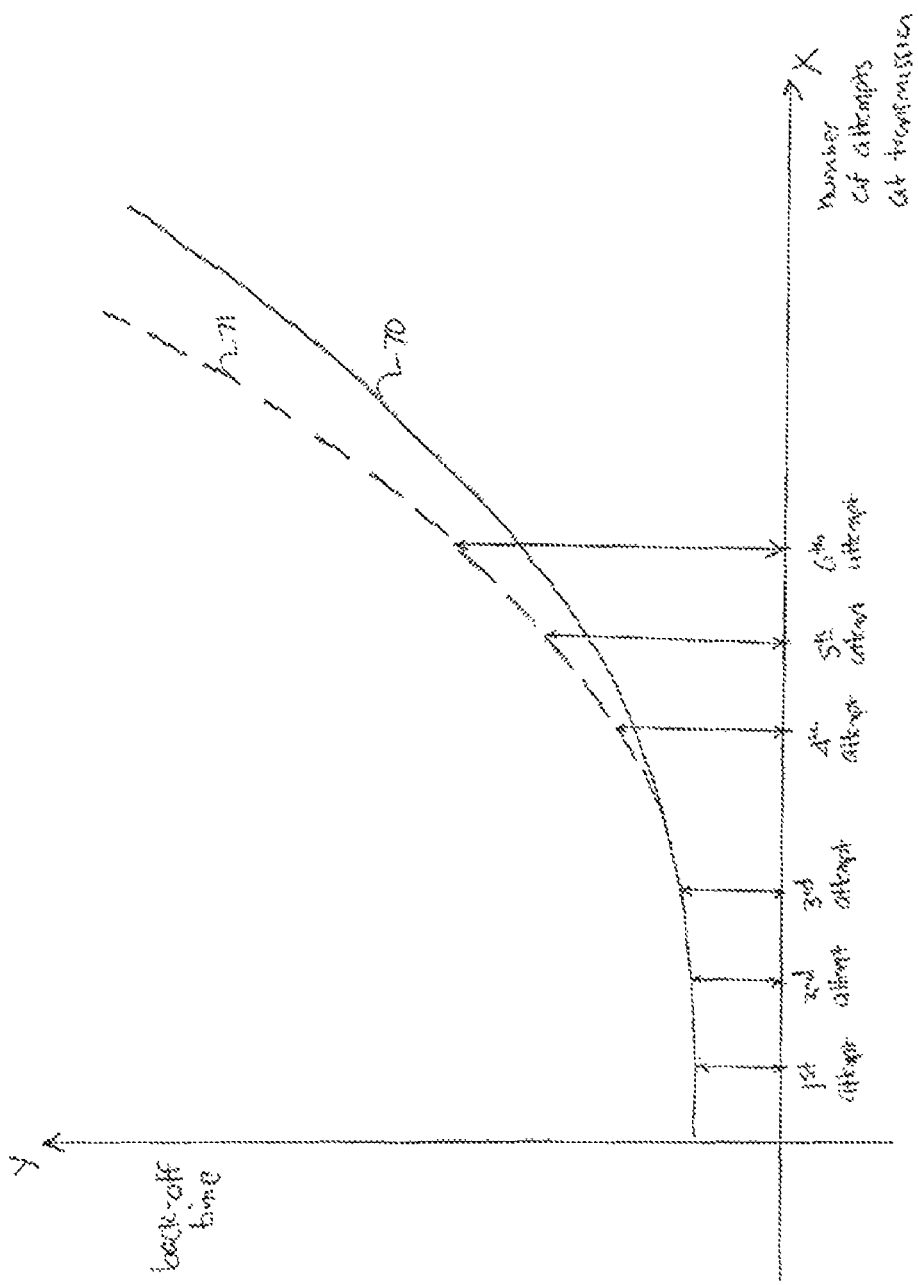
FIG. 8 is a graph showing adaptive variation of the back-off time versus number of attempts at transmission.

The period corresponds to an exponential curve, such as curve 70 in FIG. 8. Curve 70 shows the waiting (back-off) time on the Y-axis and the number of checks on the X-axis. For each attempt, the back-off time is selected to be between the X-axis and a corresponding point on the curve (e.g., the mean may be selected). Increasing the period of time between checks changes curve 70 into curve 71. The greater the amount of traffic on the channel, the more the slope of the curve increases.

As was the case above, radio hardware noise, mostly due to thermal fluctuation of air surrounding the wireless device antennas, is used as a source for generating random numbers.

In one embodiment, for a network node's first four checks of the communication channel, the back-off period ($\delta_i$), measured in milliseconds, after the $i^{th}$ check is calculated as follows.

$$\delta_i = v, \text{ if } i \leq 4, \quad (1)$$

where v is a random real number determined based on hardware noise. Following normalization, v takes on a value between 0 and 25. If four consecutive checks are made without performing a data packet transmission, the back-off period is calculated as:

$$\delta_i = d_i + n, \text{ if } i \geq 4, \quad (2)$$

where $d_i$ is a deterministic real number and n is a random real number that is also determined based on hardware noise and that takes on a value between −25 and +25 following normalization. Deterministic number $d_i$ is calculated using the following equation.

$$d_i = d_{i-1} \times (1 + 2^j/16), \quad (3)$$

where $d_{i-1}$ is the deterministic term used in the calculation for the previous back-off period, i.e., after the i−1$^{th}$ attempt, and j is an integer given by j=Int(i/3), where Int is the integer function, also commonly known as the "floor function", which outputs the largest integer less than or equal to i/3.

For the first four checks, the back-off period is essentially a random number chosen from a fixed window between 0 ms and 25 ms. After four unsuccessful checks resulting from a busy radio channel, the back-off period is extended to have a mean value of $d_i$. The value of $d_i$ grows exponentially by following different exponential curves. The exponent j=int(i/3) enables $d_i$ to grow with a different, more aggressive exponential curve following every three attempts at communication.

This back-off mechanism is performed in the media access control (MAC) layer of the International Standard Organization's Open System Interconnect (ISO/OSI) network protocol stack.

Dynamic Channel Time Slot Assignment

In traditional CSMA, a remote terminal that has a message to transmit will always first listen to the carrier channel to determine whether the channel is occupied. If the channel is free, the remote terminal will occupy a channel time slot and start transmitting. If the channel is busy, the remote terminal will wait and not transmit.

Essentially CSMA is a contention-based access scheme in which all devices are treated equally regardless of how often any particular terminal needs to transmit. In the subject network protocol, devices that need to transmit messages More frequently are automatically given more time slots for channel access. These time slots are allocated dynamically to each device depending on its access needs. This allocation is useful in increasing channel bandwidth efficiency, particularly when all devices in a network transmit messages on a periodic basis.

Figure 9:
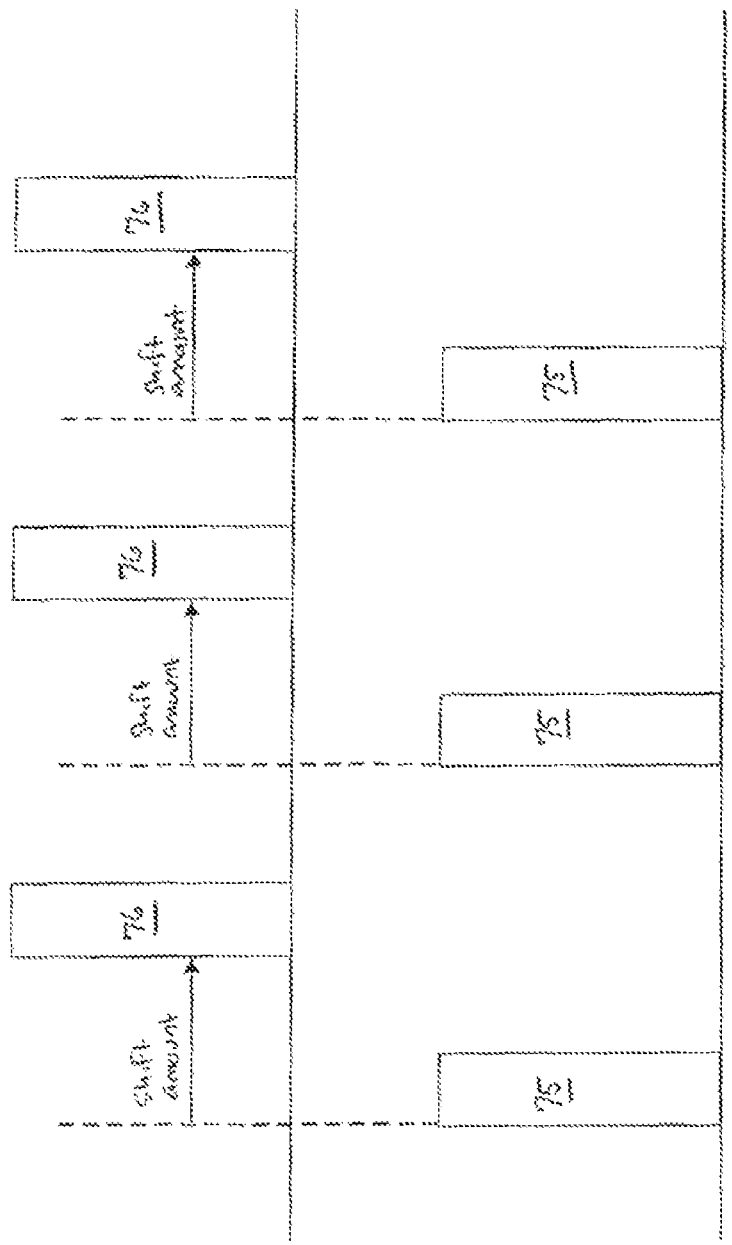
FIG. 9 is a timing diagram that shows shifting of transmission time slots to avoid data packet collisions on the wireless network.

In addition, when a remote terminal senses a collision at a particular time slot, following several retrials the remote terminal shifts the time slot by a small, randomized amount until the transmission is completed. The shifted time slot is then incorporated into the periodic transmission schedule of that remote terminal, resulting in all subsequent transmissions being shifted by the randomized amount. Shifting of time slots is shown in FIG. 9, in which original time slots are labeled 75 and shifted time slots are labeled 76.

With this randomized time slot adjustment, remote terminals that transmit more frequently automatically avoid collision and discover more time slots to meet their channel access demand. As the channel becomes busier, this process can more effectively distribute channel capacity to meet the needs of all terminals.

Packet Prioritization

A source network device a device, such as a remote terminal or base station in FIG. 1, that creates and sends data packets—rather than just forwarding others data packets) may assign each data packet a priority.

Network devices may give preference to higher-priority data packets over lower-priority data packets. For example, network devices may allocate more network bandwidth and more resources to transmitting higher-priority data packets than to transmitting lower-priority data packets. For example, as a matter of course, network devices may transmit higher priority data packets before transmitting lower-priority data packets. The network devices may even drop lower-priority data packets in favor of higher-priority data packets if such action is warranted under the circumstances.

Network devices may designate a time slot to use for packet transmission based on the priority of the data packet. For example, if a data packet has low priority, a network device will try to transmit the low-priority data packet in a time slot that is available to the network device and is located relatively far from time slots used to transmit higher-priority data packets. This reduces the possibility that the low-priority data packet will collide with higher-priority packets. Time slots for high priority data packets may also be increased in size, e.g., from 10 ms to 30 ms.

Network devices may use different methods of confirming and re-transmitting different-priority data packets. For example, if a data packet has a relatively low priority, a network device may not transmit a confirmation message, thereby saving network bandwidth. If a data packet has a relatively high priority, the network device may use a higher-level delivery confirmation method.

Several methods of delivery confirmation may be used. For example, a network device may simply confirm that a message was delivered; the network device may confirm a cyclic redundancy check (CRC) code of the packet; and/or the network device may check that the content of a message was actually delivered. Confirming delivery of content provides a better (higher) level of confirmation, but consumes more network bandwidth than other methods.

A network administrator may manually assign priorities to network devices (e.g., to each remote terminal), and thus to communications transmitted from those network devices, based on the perceived importance of the network devices. For example, network devices that transmit communications is used for security (e.g., fire alarms, sprinkler control, etc.) may be assigned a relatively high priority. On the other hand, network devices that transmit communications used for remotely controlling a television may he assigned a lower priority.

Priority may also be assigned by network group ID. For example, nodes in a network designed to control security systems may have a different group ID than nodes in a network designed to control entertainment devices. Each network node may prioritize packets based on the group ID of the device that originally sent the packet. The group ID may be contained in the packet's header.

Remote Terminal

Figure 10A:
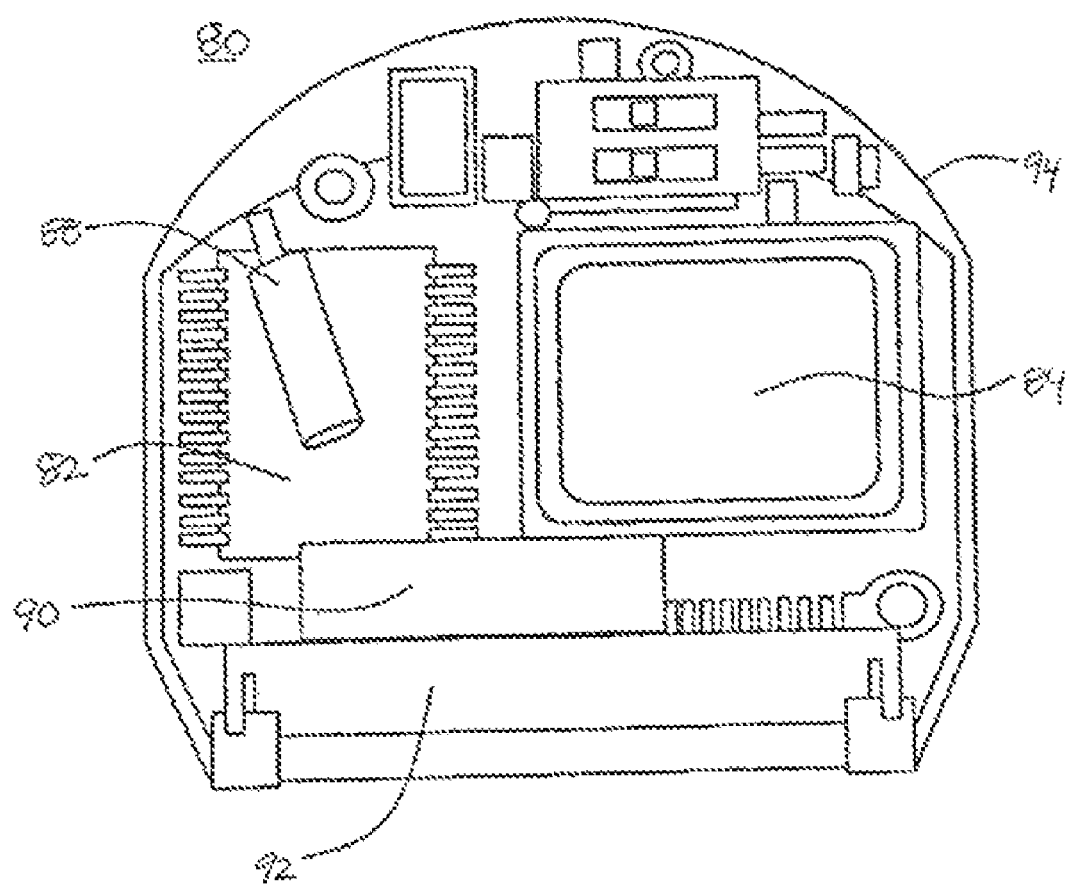
FIGS. 10A to 10C are diagrams showing one embodiment of a remote terminal device that may be used on the wireless network.
Figure 10B:
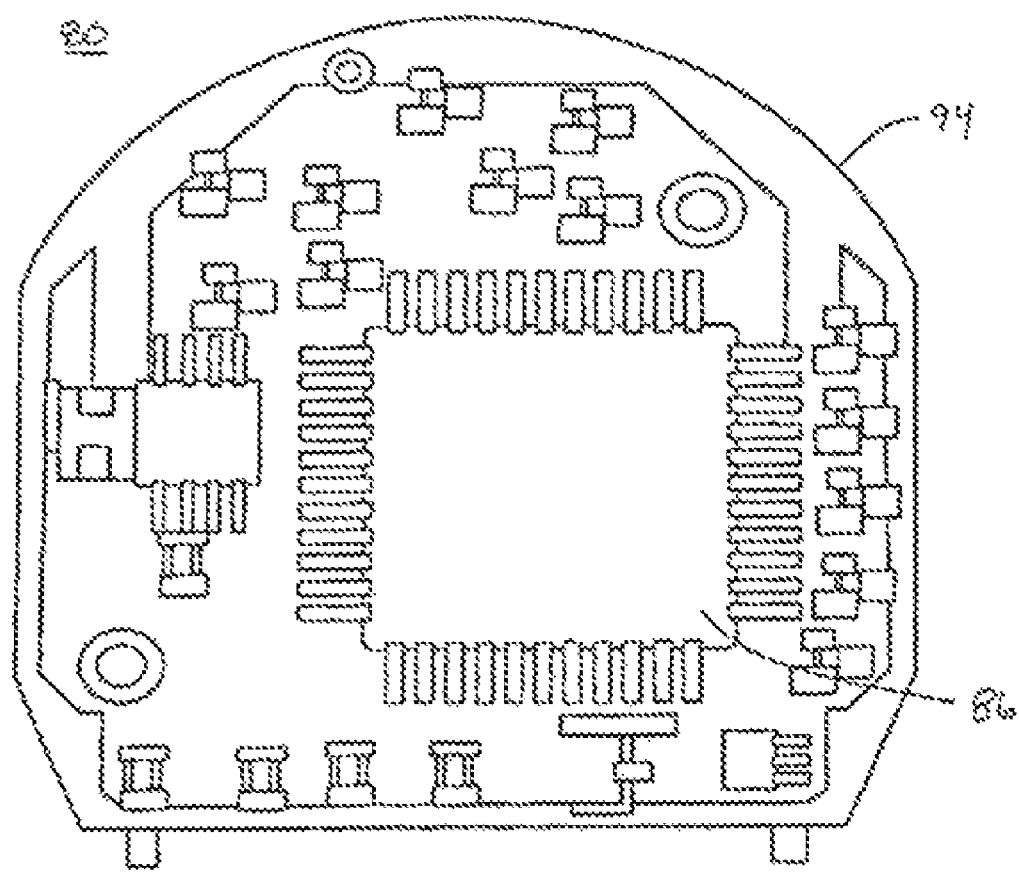
Figure 10C:
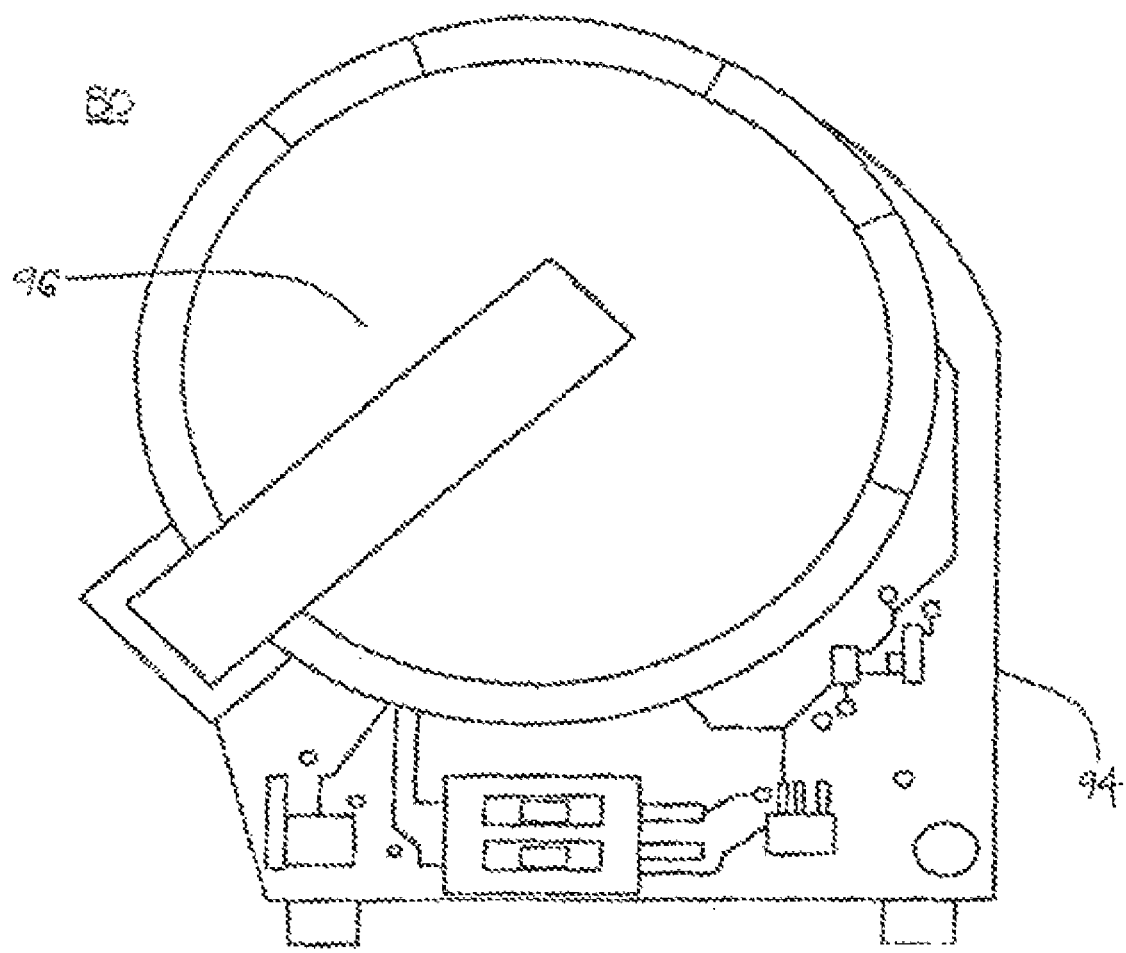

Examples of remote terminals that may be used in wireless network 10, and that may implement the functionality described herein, are described in U.S. patent application Ser. No. 09/999,098, filed on Oct. 31, 2001, the contents of which are hereby incorporated by reference into this application as if set forth herein in full. FIGS. 10A to 10C show block diagrams of one example of such a remote terminal 80.

Remote terminal 80 is a self-contained, miniaturized computer. As shown in FIGS. 10A and 10B, remote terminal 80 includes first processing unit 82, RF transceiver 84, second processing unit 86, low clock frequency crystal 88, high clock frequency crystal 90, and I/O connector 92, all mounted on circuit board 94. As shown in FIG. 10C, a power source 96, such as a battery, may be attached to circuit hoard 94. A memory containing instructions to be executed by each processing unit may be included inside each processing unit or one or more such memories (not shown) may be mounted on circuit board 94.

The small size and low power consumption of computer 80 allows computer 80 to operate from battery 90. In this embodiment, first processing unit 82 operates at a clock frequency of 32 kHz, and second processing unit 86 operates at a clock frequency of 4 MHz. A coordinating protocol operates so that computer 80 may perform signal processing and RF transmission with increased power efficiency.

The coordinating protocol is used to control the operation of remote terminal 12 by assigning tasks and operations to the processing units based upon the speed required to perform a given task of function. The coordinating protocol is designed to assign tasks to the various processing units with the result being increased power efficiency on remote terminal 12.

For example, the coordinating protocol will allow CPU 82 to assign a given task or operation (such as establishing a presence in wireless network 10) to itself or to CPU 86 based upon the speed requirements of the task or operation and the clock frequencies of the processing units. Tasks and operations which require lower clock frequencies will be assigned to CPU 86 with the lower clock frequency. Because CPU 86 operates at lower clock frequency, the power efficiency of the system as a whole is increased. When the task load of the system is low enough, the CPUs may be shut-off or placed into low-power mode to further increase the power efficiency of the system.

Architecture

The network protocol described herein may find applicability in any computing or processing environment. The network protocol may be implemented using hardware, software, or a combination thereof.

The network protocol may be implemented using one or more computer programs executing on one or more programmable computers or other machines that each includes a processor and a storage medium that is readable by the processor (including, but not limited to, volatile and non-volatile memory and/or storage components).

Each such program may be implemented in a high-level procedural or object-oriented programming language to communicate with a computer system. However, the programs can be implemented in assembly or machine language. The language may be a compiled or an interpreted language.

Each computer program may be stored on a storage medium or other article of manufacture (e.g., CD-ROM, hard disk, or magnetic diskette) that is readable by a general or special purpose programmable computer for configuring and operating the computer when the storage medium or device is read by the computer to run the network protocol described herein. The network protocol may also be implemented as one or more machine-readable storage media, configured with one or more computer program(s), where, upon execution, instructions in the computer program(s) cause one or more machines to operate in accordance with the processes described herein.

The network protocol not limited to the embodiments described. For example, the network protocol can be used with network devices other than those shown in FIGS. 1 and 10A to 10C. The network protocol can be used on homogeneous networks as well. The network protocol can be used with networks having configurations other than those shown in FIG. 1. The network protocol is not limited to use with the protocols and data transmission methods described herein, but rather is universally adaptable.

Some blocks shown in the flowcharts may be rearranged, substituted, or omitted. As such, operations performed by the network protocol are not limited to the flow patterns shown in the flowcharts.

Other embodiments not described herein are also within the scope of the following claims.

What is claimed is:

1. A method performed by a device in a wireless mesh network, comprising:
    entering a low-power mode during a period when the device is not communicating over the wireless mesh network; and
    receiving communications from the wireless mesh network, the communications passing from a second device through one or more intermediate wireless devices in the wireless mesh network, at least one intermediate wireless device in direct communication range of the device stores the communications until the device exits the low-power mode, and the at least one intermediate wireless device forwards the communications to the device when the device exits the low-power mode and is ready to receive.

2. The method of claim 1, further comprising:
    sending second communications to the wireless mesh network including an identifier of the device, the second communications passing through one or more intermediate wireless devices in the wireless mesh network to reach a target device.

3. The method of claim 2, wherein the target device being selected based on a network route associated with the one or more intermediate wireless devices.

4. The method of claim 1, further comprising:
    establishing a presence in the wireless mesh network via third communications initiated by the device.

5. The method of claim 1, further comprising:
    establishing plural master nodes, the plural master nodes comprising nodes which are intermediate wireless devices in direct communication range of the device and include routing information to the target device on the wireless mesh network, at least one of the plural master nodes mediating access of the device to the wireless mesh network.

6. The method of claim 5, wherein establishing plural master nodes comprises:
    identifying N (N>1) nodes on the wireless mesh network having fewest numbers of hops from the device to a base station on the wireless mesh network; and
    storing data corresponding to the N nodes in memory.

7. The method of claim 5, wherein the plural master nodes comprise a primary master node and a secondary master node, the device communicating to the wireless mesh network via the primary master node and via the secondary master node if there is a problem with the primary master node.

8. The method of claim 7, wherein the primary master node can deliver a message to the target device on the wireless mesh network, the message passing through a fewer number of intermediate wireless devices than does the secondary master node.

9. The method of claim 5, wherein at least one of the plural master nodes stores the data from the wireless mesh network, and the device receives the data from the at least one of the plural master nodes.

10. A system comprising:
(i) wireless network devices comprising:
   plural target devices; and
   plural repeater devices for routing data; and
(ii) a device that runs a network protocol to:
   send communications to the wireless mesh network including an identifier of the device, the communications passing through one or more intermediate wireless devices in the wireless mesh network to reach a target device of the plural target devices, wherein the target device being selected based on a network route associated with the one or more intermediate wireless devices.

11. The system of claim 10, wherein the communications reach the target device to which the communications can pass through the fewest number of intermediate wireless devices from the device.

12. The system of claim 10, wherein the device further runs the network protocol to;

receive second communications from the wireless mesh network, the second communications passing from one of the plural target devices through one or more intermediate wireless devices in the wireless mesh network.

13. The system of claim 12, wherein the second communications are originated by a target device from which the message can pass through the fewest number of intermediate wireless devices to the device.

14. A non-transitory medium that stores instruction which, when executed, cause a device to:
   enter a low-power mode during a period when a device is not communicating over the wireless mesh network; and
   receive communications from the wireless mesh network, the communications passing from a second device through one or more intermediate wireless devices in the wireless mesh network, at least one intermediate wireless device in direct communication range of the device stores the communications until the device exits the low-power mode, and the at least one intermediate wireless device forwards the communications to the device when the device exits the low-power mode and is ready to receive.

* * * * *